Patented Aug. 29, 1944

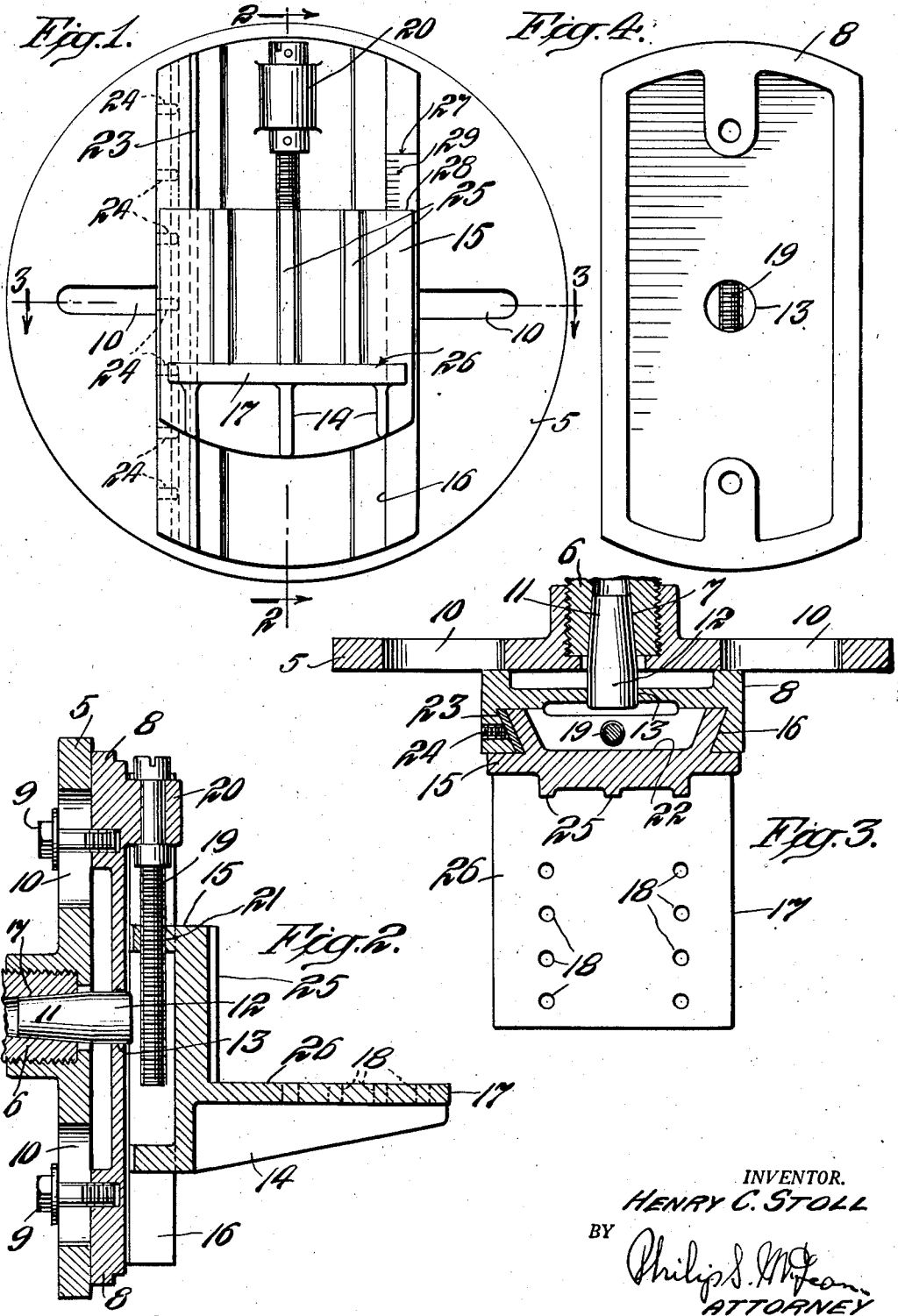

2,357,062

UNITED STATES PATENT OFFICE 2,357,062

ANGLE PLATE FOR LATHES

Henry C. Stoll, Jackson Heights, N. Y.

Application October 20, 1943, Serial No. 507,217

1 Claim. (Cl. 82—40)

The invention herein disclosed relates generally to angle plates such as applied to the face plates of lathes, for carrying bearing blocks and other special pieces which must be supported from a position off to one side of the lathe center.

Heretofore, angle plates have usually been directly bolted to the face plate and this has required special skill, patience and time to get a proper setting and mounting of the work.

Special objects of the present invention are to provide an angle plate construction, which will enable the lathe operator to quickly, easily and accurately secure and position a work piece under circumstances such as described, and to provide mechanism for the purpose, which may be readily applied to any ordinary lathe.

Other purposes of the invention will appear from the following specification.

The drawing accompanying and forming part of the specification, illustrates a present commercial embodiment of the invention. Structure however may be modified and changed as regards this particular illustration, all within the true intent and broad scope of the invention as hereinafter defined and claimed.

Fig. 1 in the drawing is a front or face view of the angle plate attachment as applied to the face plate of a lathe.

Figs. 2 and 3 are central sectional views as on substantially the planes of lines 2—2 and 3—3 of Fig. 1.

Fig. 4 is a back view of the attachment.

In Figs. 1, 2 and 3, a face plate of ordinary construction is shown at 5, screwed onto a lathe spindle 6, of ordinary construction, having a tapered socket 7, for the lathe center.

The angle attachment comprises in the illustration, first a base 8, applicable directly over the flat face of the face plate and secured in this relation by bolts 9, extending through the radial slots 10, usually present in such face plates, into the back of the base. As a guide to locating and centering the base over the face plate, there is provided in the illustration, a nose plug having a tapered portion 11, for self-centering engagement in the spindle socket 7, and a cylindrical portion 12, slidably engageable in the center guiding and supporting opening 13, in the base 8.

The angle plate proper is shown as consisting of a block 14, having a mounting portion 15, slidable in an undercut dovetail guideway 16, in the base, extending diametrically across the lathe center and a rectangularly projecting work supporting portion 17. The latter is suitably equipped for fastening the work thereto, it being shown in this instance, as having rows of screw holes 18, to receive bolts for directly securing the work or for holding clamp bars or the like, for securing a workpiece in position.

Adjustment of the angle piece is effected in the illustration by a feed screw 19, rotatably held in a bearing lug 20, on the base and having screw engagement with the mounting portion of the angle block at 21. This feed screw is shown disposed in the channel of the guideway and the intermediate part of the mounting portion 15, of the angle block is shown hollowed out at 22, Fig. 3, to provide clear space for the feed screw. The center pin or nose plug as it has been termed, preferably is just long enough to certainly fully engage the center opening in the base, so as not to engage or interfere with free action of the feed screw.

The angle block is secured in any position of radial adjustment on the base by means consisting in the present disclosure of an inclined gib 23, disposed in one side of the guideway and adapted to be set in firm holding engagement with the base portion of the angle block by clamp screws 24, disposed to enable the locking of the angle block in any of its various possible positions of adjustment.

From the foregoing, it will be apparent that the angle plate attachment can be quickly applied to any ordinary lathe by simply plugging the tapered stem of the center pin into the taper socket in the end of a lathe spindle and then engaging the base piece 8, over the short projecting cylindrical portion of such plug. This will temporarily support the base in centered position on the face plate, while the attaching bolts 9, are passed through from the back of the face plate and tightened up. The angle block is finished with true working faces 25 and 26, at a right angle to each other, which can be utilized as such in the proper setting and securing of the work piece on the supporting portion 17, of the angle block. The work can then be accurately centered by radial adjustment of the angle block, through the medium of the feed screw. When such adjustment is accomplished, the angle block can then be firmly secured in position by setting up one or more of the gib clamping screws 24, which are opposed to the sliding base portion 15, in that position of adjustment.

The base piece is substantially flat, so as to lie close against the face plate and the base portion of the angle block is set into the base, so as not to project to any objectionable extent. The hollow back 22, of the sliding portion of the angle block provides space for accommodating the feed screw at the back of the angle block and in front of the end of the short or stubby nose piece. The base having a sliding engagement over the nose piece allows for any slight variations in the fit of the nose piece in different lathe spindles. The feed screw may be used at times to set the angle block in two or more different positions, for example, in cases where two or more cuts are to be made on different portions of the workpiece.

To show when the working face 26, of the angle piece is at the center, a mark 27, is provided on the base with which the outer edge 28, of the base portion 15, will register when the working face is exactly at the center of the lathe. From this center mark, a scale 29, may be extended to enable an operator to accurately adjust the angle piece radially in respect to the center.

Various attachments or accessories may be mounted on the angle block, for carrying out different kinds of operations. For example, different kinds of sub-bases may be bolted to the work face 26, which would provide for adjustment of a work piece at a right angle or any other angle to the adjustment provided by feed screw 19. In fact, the work carrier 17 may have a guideway formed therein transverse to the guideway 16, with a special work mount adjustable in that guideway in a plane intersecting the first plane of adjustment. This adjustable work carrier therefore may serve as a universal type of mount for many kinds of work.

What is claimed is:

An angle plate for a lathe having the usual hollow spindle and face plate mounted thereon, comprising a nose plug having a tapered stem engageable in the end of such a hollow lathe spindle and a short projecting substantially cylindrical portion, a base applicable over the face of such a face plate and having a central opening engageable over the projecting portion of the nose plug, means for detachably securing said base in such centered position on a face plate, said base having a radially extending undercut guideway in the exposed face of the same, an angle block having a base portion slidable in said guideway and an angularly projecting work supporting portion, a feed screw on the base for shifting said angle block in said guideway, releasable means for securing said angle block in various positions of radial adjustment on said base, said base portion of the angle block being hollowed at the back, over the end of said nose plug to provide a clear space for the feed screw and the feed screw being rotatably mounted on the base in line with and extending into the clear space so provided.

HENRY C. STOLL.